United States Patent
Nagy et al.

(10) Patent No.: US 11,485,565 B2
(45) Date of Patent: Nov. 1, 2022

(54) PACKAGED FOOD PRODUCT AND METHOD OF PACKAGING

(71) Applicant: General Mills Inc., Minneapolis, MN (US)

(72) Inventors: Jason Nagy, Maple Grove, MN (US); Richard Zarnoch, Minneapolis, MN (US)

(73) Assignee: General Mills, Inc., Minneapolis, MN (US)

( * ) Notice: Subject to any disclaimer, the term of this patent is extended or adjusted under 35 U.S.C. 154(b) by 140 days.

(21) Appl. No.: 16/848,163

(22) Filed: Apr. 14, 2020

(65) Prior Publication Data

US 2021/0316930 A1   Oct. 14, 2021

(51) Int. Cl.
*B65D 81/32* (2006.01)
*A21D 13/16* (2017.01)
*A21D 10/02* (2006.01)
*B65B 25/16* (2006.01)
*B65D 8/00* (2006.01)

(52) U.S. Cl.
CPC ....... *B65D 81/3216* (2013.01); *A21D 10/025* (2013.01); *A21D 13/16* (2017.01); *B65B 25/16* (2013.01); *B65D 15/04* (2013.01)

(58) Field of Classification Search
None
See application file for complete search history.

(56) References Cited

U.S. PATENT DOCUMENTS

| | | | |
|---|---|---|---|
| 2,949,369 A | 8/1960 | Zoeller et al. | |
| 3,182,890 A | 5/1965 | Elam | |
| 3,851,757 A | 12/1974 | Turpin | |
| 3,962,476 A | 6/1976 | Turpin | |
| 4,114,784 A | 9/1978 | Hough et al. | |
| 5,950,913 A | 9/1999 | Rea et al. | |
| 6,109,470 A | 8/2000 | Antal, Sr. et al. | |
| 6,116,500 A | 9/2000 | Cahill | |
| 6,293,422 B1 * | 9/2001 | Jentzsch | B65D 21/023 220/608 |
| 9,682,791 B2 | 6/2017 | Lorence et al. | |
| 2013/0129874 A1 * | 5/2013 | Fenske | B65D 81/2053 426/128 |
| 2016/0075497 A1 | 3/2016 | Folatelli | |

(Continued)

*Primary Examiner* — Jenna A Watts
(74) *Attorney, Agent, or Firm* — Diederiks & Whitelaw, PLC; John L. Crimmins, Esq.

(57) ABSTRACT

A packaged food product includes a container having at least one dough product and a cup within the container. The cup includes at least one sidewall, a plurality of tapered guide members located at spaced circumferential positions about the sidewall, a bottom wall and an upper annular rim. The rim also defines an opening, opposite the bottom wall, leading to an interior storage cavity of the cup. During initial insertion of the cup into a container, first portions of the guide members are progressively pressed against an interior sidewall surface of the container and assure a proper, level alignment of the cup, preventing the cup from tipping during insertion. With further insertion, second portions of the guide members lead to the rim, with the rim having a diameter which assures a tight friction fit, potentially in combination with a cup seal cover, to an inner diameter of the container.

23 Claims, 6 Drawing Sheets

(56) References Cited

U.S. PATENT DOCUMENTS

| | | | |
|---|---|---|---|
| 2016/0107817 A1* | 4/2016 | Thornton | B65D 15/06 |
| | | | 426/119 |
| 2017/0008658 A1 | 1/2017 | Lagace et al. | |
| 2017/0253377 A1* | 9/2017 | Mitrey | B65D 21/0233 |
| 2019/0359408 A1 | 11/2019 | Kackman et al. | |

* cited by examiner

PACKAGED FOOD PRODUCT AND METHOD OF PACKAGING

BACKGROUND OF THE INVENTION

The invention pertains to the art of food production and, particularly, to a packaged food product, as well as a method of packaging the food product. More specifically, the present invention relates to a tubular container for packaging dough products where one or more additional ingredients are provided in a separate region within the tubular container.

Due to the time demands placed on consumers by the everyday activities of modern life, the preparation of food products and meals from scratch has decreased and the popularity of premade or partially premade foods has increased dramatically. One type of food product that has become increasingly popular in premade configurations are dough-based food products such as, for example, developed and undeveloped dough products. These dough products can be stored in either a refrigerated or frozen state for extended periods and are "freshly" prepared in a matter of minutes as desired by the consumer. In some instances, these dough products can represent a substantially final product requiring only a heating or baking step such as, for example, cookies, bread, breadsticks, biscuits, rolls and croissants. Alternatively, these dough products can represent components or building blocks of a final product such as, for example, a pie crust or pizza dough that will be combined with a variety of other ingredients to form the final product. Regardless of whether the dough product itself constitutes a final product or merely a component of the final product, these dough products constitute enormous time savers for the consumer in that the consumer need not prepare the dough products from scratch using base ingredients such as, for example, flour, water, eggs, yeast, salt, sugar and the like.

One popular method for packaging and storing dough products has been to use a can format where the dough product is contained within a cylindrical paperboard body having caps at both ends of the body. In such a container, the can body is torn open by the consumer to expose the can contents and enable the removal of individual dough products without substantial product deformation. Depending upon the dough product, these cans can be constructed to withstand substantial internal pressures. While the can format does work very well for dough products alone, there are some instances in which it is desirable to include additional ingredients with the dough product to complete or enhance enjoyment of the final cooked dough product. Such additional ingredients can include, for example, condiments, fruits, icing, spices, nuts, candies and the like. To accommodate these additional ingredients in a can format, a variety of designs have been utilized for separating the additional ingredients from the dough. Certain known configurations employ the use of separate cups to store the additional ingredients. While cups can be successfully used to separate and store dough products and additional ingredients in a can format, it can be challenging to consistently insert the cups into the cans due to both cup-to-cup and can-to-can size variations. In theory, tighter manufacturing tolerances could be employed. However, this is typically expensive. Accordingly, it would be desirable to provide another, more cost-effective way to facilitate the insertion of cups into cans when packaging dough products with additional ingredients.

SUMMARY OF THE INVENTION

The present invention provides a packaged food product and method employing a cup including at least one sidewall, a plurality of tapered guide members located at spaced circumferential positions about the sidewall, a bottom wall and an upper annular rim. The rim also defines an opening, opposite the bottom wall, leading to an interior storage cavity of the cup. During initial insertion of the cup into a container for a dough product, first portions of the guide members are progressively pressed against an interior of the sidewall and assure a proper, level alignment of the cup, preventing the cup from tipping during insertion. Second portions of the guide members lead to the rim, with the rim having a diameter which assures a tight fit to an inner diameter of the container. Accordingly, a secure friction fit is established for the cup within the container.

Overall, in accordance with a preferred embodiment of the invention, the packaging process generally involves initially inserting the cup into an opening at a first end of the container, with the cup being either subsequently or pre-filled with one or more additional food ingredients. In a preferred embodiment, the cup is pre-filled and sealed with a metal foil or other cover. Again, the guide members provide for a level alignment of the cup. Thereafter, the cup is forced to shift within the container to a second opposite end of the container, during which the upper rim becomes frictionally fit within the container. In a preferred embodiment, the cup is forced to shift by applying a vacuum source at the second end of the container. The second end of the container is sealed with an end closure, one or more dough products are deposited into the container through the opening at the first end of the container, and then the opening at the first end is closed by another end closure. During storage, the one or more dough products proofs and expands.

In one exemplary embodiment, the above packaging and method are used with icing and a plurality of cinnamon rolls, and the sidewall of the container comprises a spirally-wound construction of an inner liner layer, an outer label layer and one or more intermediate layers of composite material, while the cup is molded of plastic. The container and cup are both generally cylindrical.

Additional objects, features and advantages of the invention will become more readily apparent from the following detailed description of preferred embodiments thereof when taken in conjunction with the drawings wherein like reference numerals refer to common parts in the several views.

DETAILED DESCRIPTION OF THE INVENTION

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

Figure 1:
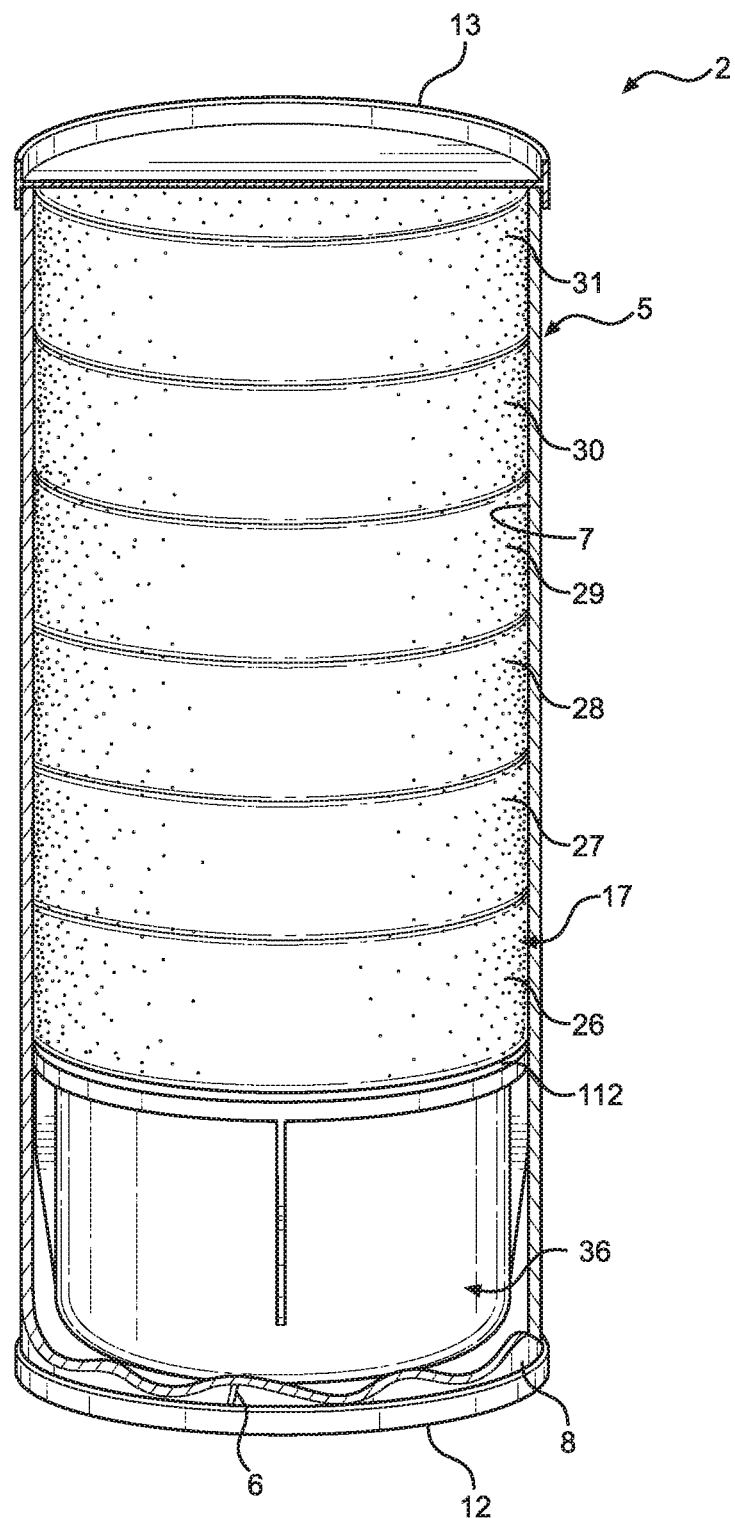
FIG. 1 is a perspective, partial cross-sectional view of a final packaged food product produced in accordance with the present invention.

With initial reference to FIG. 1, there is shown a packaged food product 2 produced in accordance with the present invention. Packaged food product 2 comprises a container or can 5. Container 5 takes the form of a tube and includes a sidewall 6 having an inner surface 7 and an outer surface 8. In the embodiment shown, sidewall 6 is made of a composite material (e.g., paperboard) and includes a spiral seam (not separately labeled but shown at the designation for outer surface 8). Specifically, in a preferred embodiment, sidewall 6 comprises a spirally-wound construction of an inner liner layer of plastic and/or foil, an outer paper label layer and one or more intermediate layers of thin paperboard. Container 5 is closed at both ends, such as with first and second end closures or endcaps 12 and 13, which are crimped, seamed or otherwise secured to the bottom and top of sidewall 6, respectively, to establish an interior cavity 17. Endcaps 12 and 13 can be made from metal or plastic, for example.

A plurality of dough products are located within interior cavity 17. Specifically, in the embodiment shown, interior cavity 17 contains a plurality of stacked dough products 26-31 in the form of dough discs, which are used to make cinnamon rolls. However, at this point, it should be realized that the invention can be utilized in packaging various types of dough products, including dough discs, one or more sheets of dough or even a block of dough, for making a wide range of final products, including cookies, bread, biscuits, rolls, croissants, pie crust, pizza dough and the like.

Dough products 26-31 can generate substantial pressure within can 5 during storage. In particular, dough products 26-31 undergo chemical reactions and generate gas pressure in a process known as "proofing". Preferably, can 5 is configured to withstand internal pressures in the range of 8 to 35 psi (55 to 241 kPa) so that can 5 remains intact over the shelf life of dough products 26-31. To withstand such pressure, endcaps 12 and 13 engage end portions of sidewall 6, either through a process of crimping or seaming, to retain dough products 26-31 despite significant force acting directly or indirectly on endcaps 12 and 13.

A cup 36, constructed in accordance with a first embodiment of the invention, is shown positioned below dough products 26-31 within interior cavity 17. At least one additional food ingredient for use with dough products 26-31 is located within cup 36. For example, in the embodiment shown where dough products 26-31 constitute discs used to make cinnamon rolls, cup 36 contains an additional food ingredient in the form of icing, which can be spread upon the subsequently cooked cinnamon rolls. In other embodiments, cup 36 can contain other ingredients such as garlic, herbs, spices, seasoning, cheese, butter, condiments, sauces, fruits, nuts, candies or the like. If desired, cup 36 can contain a plurality of additional food ingredients or multiple cups can be provided within interior cavity 17, each containing an additional food ingredient.

Figure 2:
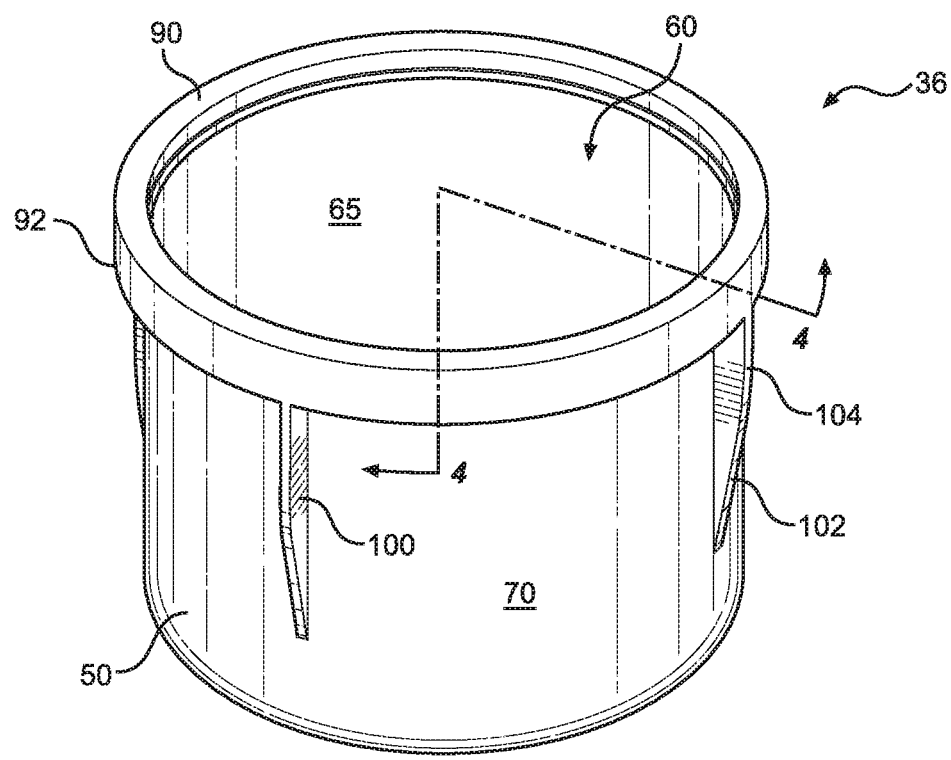
FIG. 2 is an upper perspective view of a cup of the packaged food product.
Figure 3:
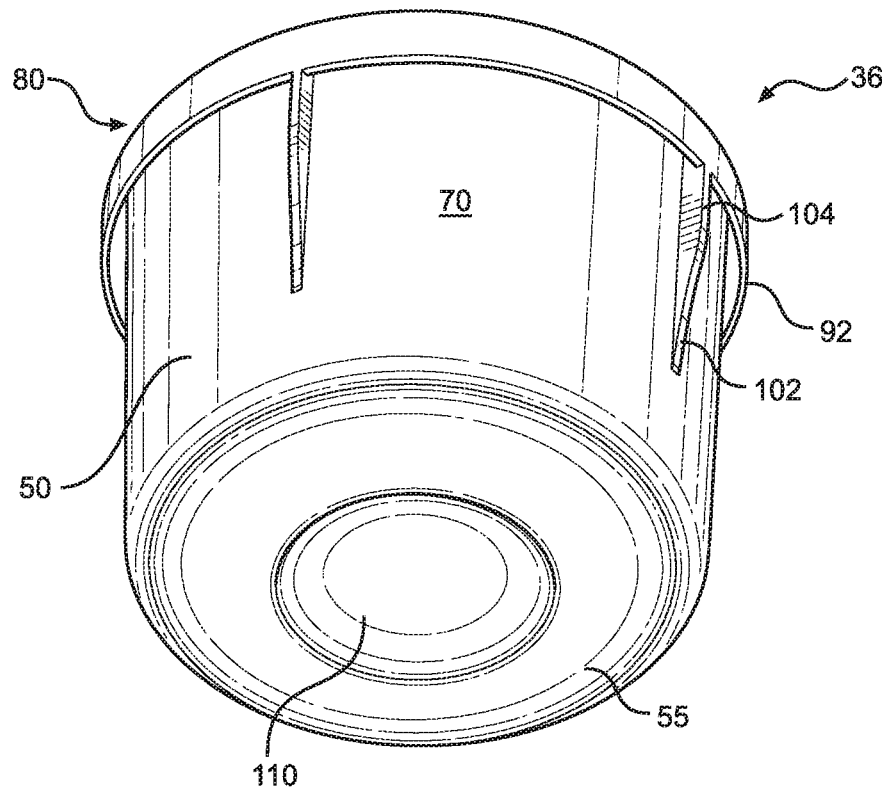
FIG. 3 is a lower perspective view of the cup.
Figure 4:
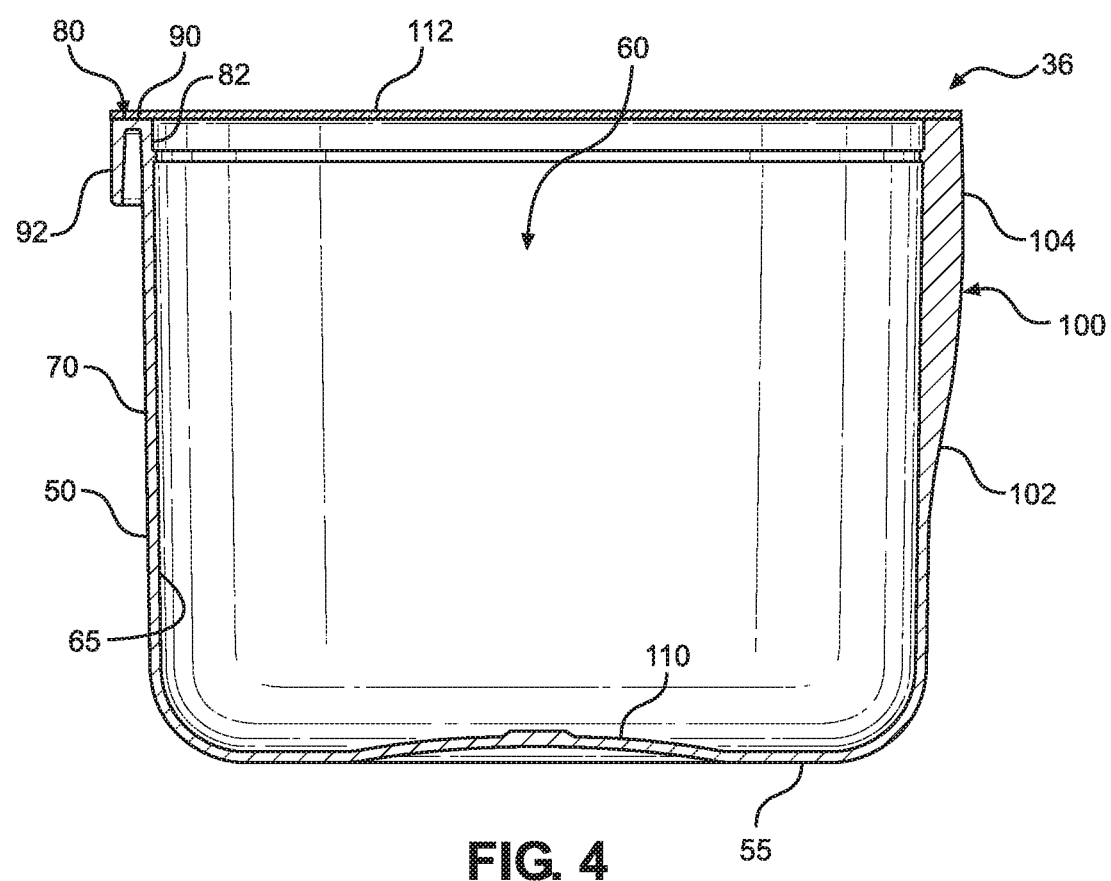
FIG. 4 is a cross-section of the cup taken along line 4-4 of FIG. 2.

With reference now to FIGS. 2-4, cup 36 is shown separate from the rest of packaged food product 2. Cup 36, like container 5, is generally cylindrical and includes a sidewall 50 and a bottom wall 55, which together define an internal cavity 60 for one or more additional food ingredients. Sidewall 50 has an inner surface 65 and an outer surface 70. Cup 36 further includes an upper, annular rim 80, which defines an opening 82 opposite bottom wall 55. More specifically, upper rim 80 includes an uppermost radial portion 90 leading to a downturned portion 92. With this construction, downturned portion 92 is radially spaced from outer surface 70. Projecting from outer surface 70 at spaced circumferential positions of sidewall 50 are a plurality of elongated guide members 100. Although the exact number of guide members 100 can vary, the illustrated embodiment depicts four equally spaced guide members 100. Each of the guide members 100 extends at least ½ and preferably about ⅔ the overall vertical height of cup 36 and includes a first, tapered portion 102 leading to a second portion 104 which has a greater radial dimension than the first, tapered portion 102. Each second portion 104 is joined directly to downturned portion 92 of rim 80. As also shown in at least FIGS. 3 and 4, bottom wall 55 of cup 36 has a convexly curved or otherwise raised central portion 110. In a preferred embodiment, cup 36 is integrally molded of plastic and is sealed is a foil layer or other cover 112 which is attached, such as with adhesive, atop rim 80.

Figure 5:
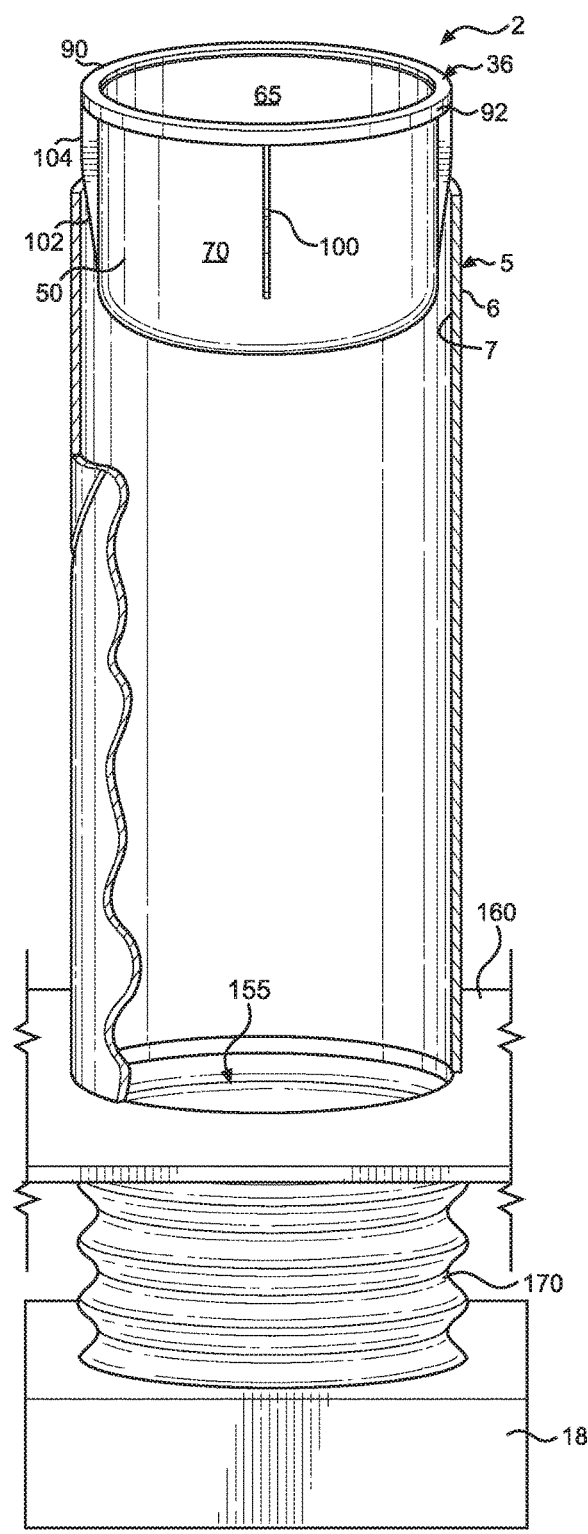
FIG. 5 is a partial cross-sectional view illustrating an initial insertion of the cup into a container of the packaged food product.
Figure 6:
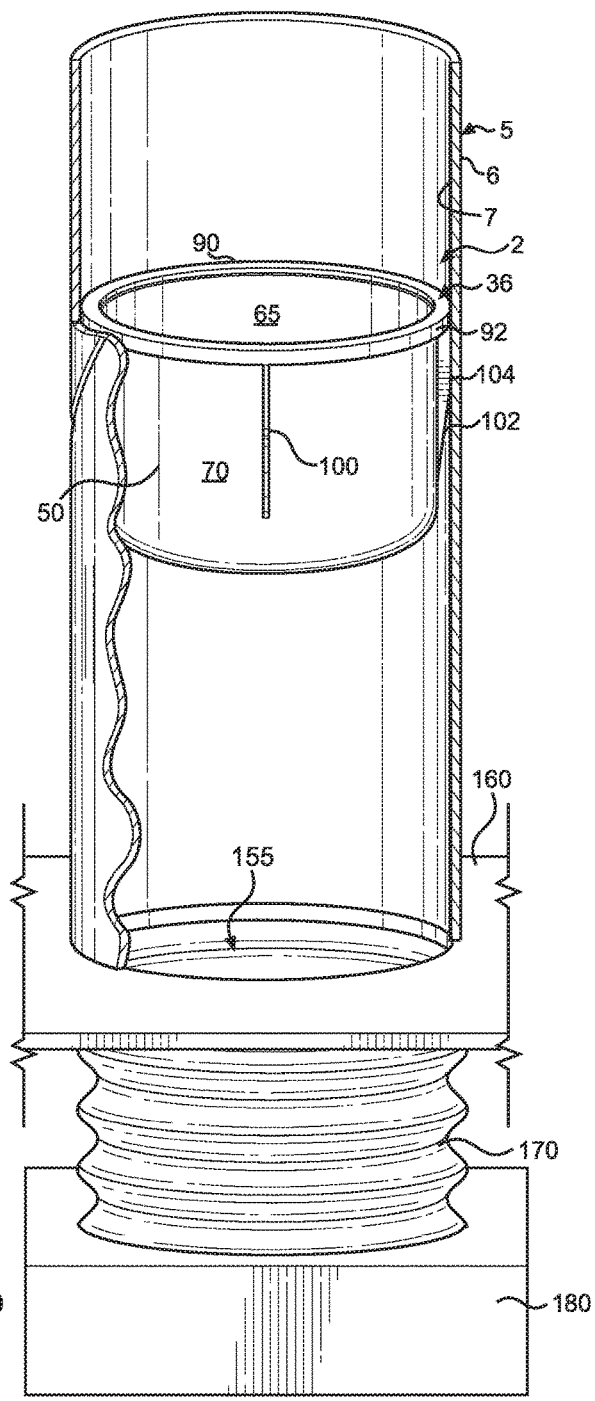
FIG. 6 is a partial cross-sectional view, similar to FIG. 5, illustrating the forced shifting of the cup within the container.

Reference will now be made to FIGS. 5 and 6 in describing the packaging process for food product 2, with container 5 being shown in tubular form with an opening at the bottom of sidewall 6 aligned with an opening 155 formed in a plate 160. Opening 155 is aligned with tubing 170 connected to a vacuum source generally illustrated at 180. As shown in FIG. 5, cup 36 has been partially inserted in the open top of container 5. Although cover 112 is not shown in these figures, as indicated above, cup 36 would preferably be pre-filled with one or more additional food ingredients and sealed. More importantly, it should be noted that first, tapered portion 102 of each guide member 100 has engaged inner surface 7 of container 5. Given the structure of guide members 100 and their interaction with sidewall 6, cup 36 is directed to a level configuration, i.e., cup 36 is generally self-leveled to avoid any tipping thereof, and sidewall 50 of cup 36 is spaced from and substantially parallel to inner surface 7 of container 5. Either at this time or previously, vacuum source 180 is activated, creating a force which draws cup 36 into container 5 (see FIG. 6) against an increasing frictional resistive force, with this force reaching a maximum when the uppermost part of second portion 104 and downturned portion 92 of upper rim 80 directly contact inner surface 7. This process continues until cup 5 reaches the bottom of container 5, i.e., the position shown in FIG. 1. The termination of this operation can be performed in various ways, including the shifting of plate 160, the de-activation of vacuum source 180 or, although not shown, the engagement of bottom wall 55 of cup 36 with structure that extends at least partially across opening 155.

Figure 7:
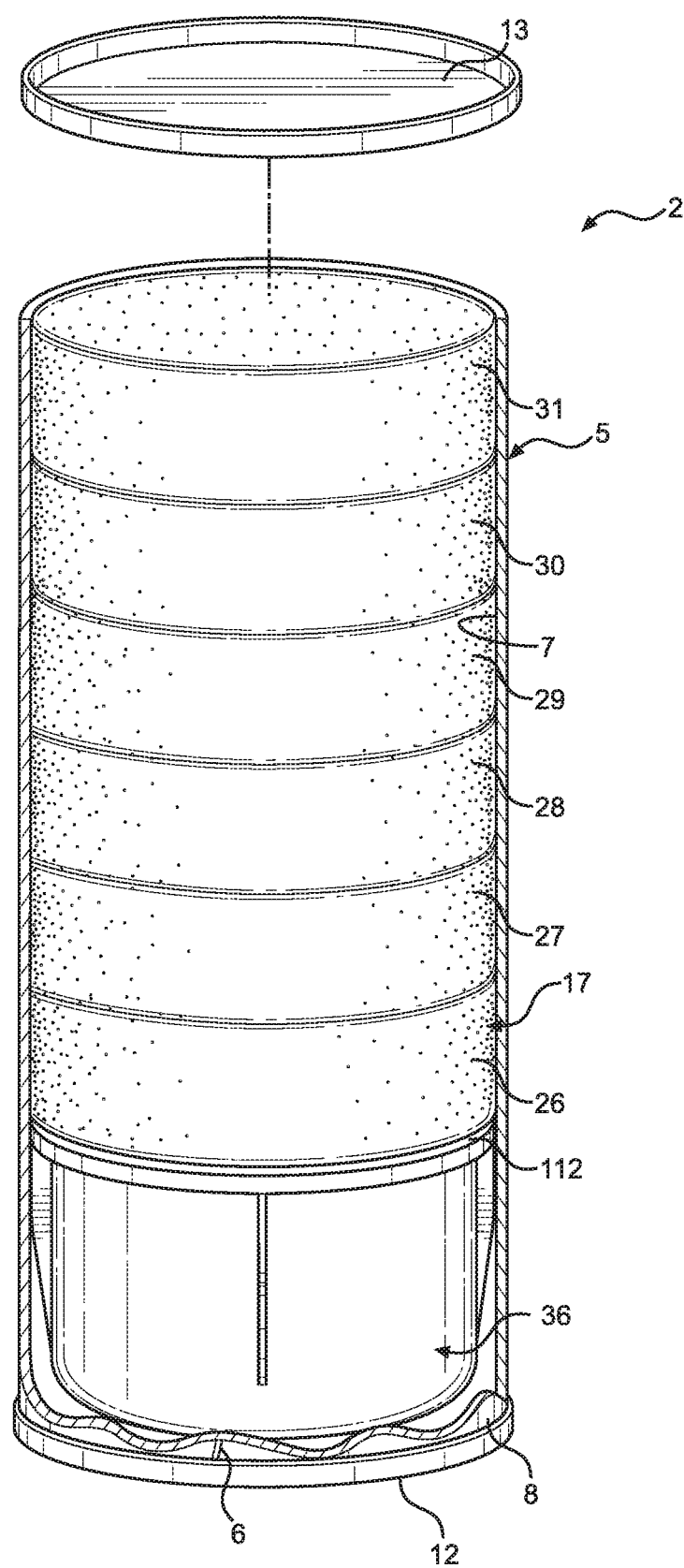
FIG. 7 is a partial cross-sectional view, similar to FIG. 1, but with the final end closure being shown exploded from the container.

As stated above, when cup 36 is forced within container 5 from the position shown in FIG. 5 and through the position shown in FIG. 6 to reach the final position shown in FIG. 1, the second portions 104 of guide members 100 and downturned portion 92 of upper rim 80 directly contact inner surface 7. In this manner, cup 36 is securely mounted within container 5 through a friction fit connection. It should also be noted that cup 36 could be forced to shift within container 5 in other ways, such as employing a solenoid plunger or the like which pushes cup 36 down to the second end of container 5. In addition, in certain embodiments, downturned portion 92 of upper rim 80 can be made to accommodate a limited degree of radial deflection between adjacent guide members 100, particularly in an intermediate region between adjacent guide members 100. With particular reference to FIG. 7, after cup 36 is fully inserted within container 5, bottom closure 12 is sealed to sidewall 6 to establish a bottom for container 5 juxtapose bottom wall 55, dough products 26-31 are deposited within container 5 atop cup 36, and then the opening at first or top end of container 5 is sealed by upper closure 13, such as by crimping closure 13 to sidewall 6.

As discussed above, the additional food ingredient can comprise icing, which can be spread upon dough products 26-31 after dough products 26-31 are baked. While the icing could be in direct contact with cup 36, in other embodiments, the icing is provided in a pouch, with this pouch being located in cup 36. Of course, such an arrangement is not limited to icing but can also be used with the other additional food ingredients listed above (e.g., garlic, herbs, spices, seasoning, cheese, butter, condiments, sauces, fruits, nuts, candies, etc.). In addition, it should be noted that sealing layer or cover 112 could actually extend over the outer peripheral edge of cup 36 (i.e., overlap rim 80 and about downturned portion 92) to further enhance frictional fitting of cup 36 in container 5.

While the dimensions of cup 36 can vary, certain exemplary dimensions are provided below for illustration purposes. Particularly, in the depicted embodiment, cup 36 has a height in the order of 1.718 inches (4.36 cm), an outermost diameter at downturned portion 100 and at the uppermost part of the flared guide members 100 of 2.262 inch (5.75 cm), an inner diameter of 1.0 inch (2.54 cm), a central bottom portion raised in the order of 0.025 inches (0.064 cm), a downturned portion length of 0.230 inches (0.58 cm), an overall guide member height of 1.145 inches (2.91 cm), a second, substantially uniform diametric portion of each guide member having a length of 0.348 inches (0.88 cm), a sidewall thickness of about 0.030 inches (0.076 cm) at rim 90 and a sidewall thickness of about 0.024 inches (0.061 cm) at the transition of the bottom wall and the sidewall.

Figure 8:
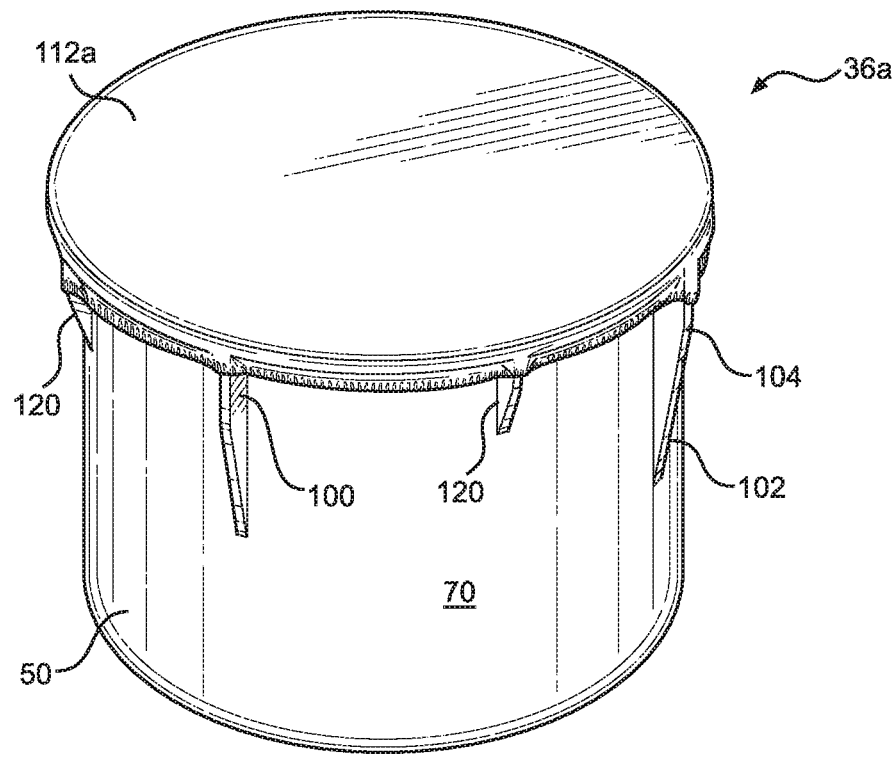
FIG. 8 is an upper perspective view, similar to FIG. 2, but depicting a cup according to a second embodiment of the invention.
Figure 9:
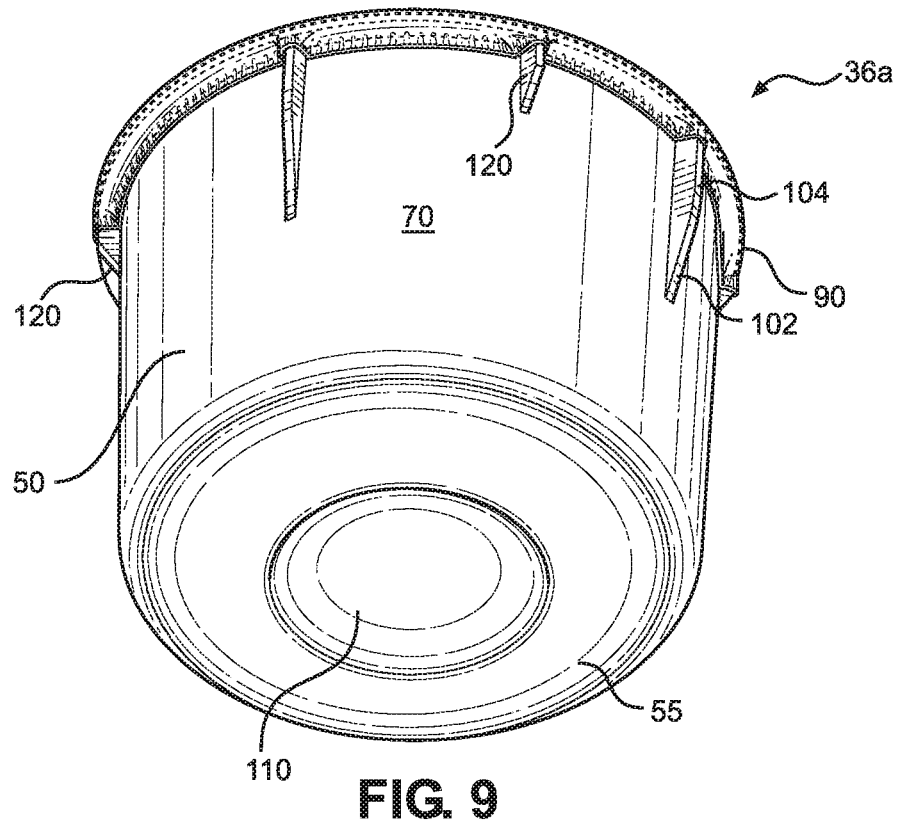
FIG. 9 is a lower perspective view, similar to FIG. 3, but of the cup of FIG. 8.

As indicated above, FIGS. 8 and 9 depict another embodiment for the cup component of the invention. As shown in these figures like references refer to corresponding parts between the two exemplary embodiments. Three particular distinctions are to be noted. That is, it should be first noted that cup 36a of FIGS. 8 and 9 lacks a corresponding downturned portion 92, while the second portion 104 of each guide member 100 still extends all the way to uppermost radial portion 90. Second, this embodiment illustrates that additional or secondary guide members 120 can be included at circumferentially spaced locations, and that these additional guide members need not be identically constructed to guide members 100. As shown, guide member 120 is of shorter length than any given guide member 100 and is interposed between an adjacent pair of guide members 100. Finally, cup 36a is used to illustrate that different cover arrangements can be employed. As shown in these figures, a sealing cover defined by a foil layer 112a wraps around and is crimped under uppermost radial portion 90. With such a construction, the cover material actually interfaces with the inner surface 7 of container 5 upon insertion.

Based on the above, it should be readily apparent that the present invention provides a cost-effective and efficient way to frictionally retain cups within cans when packaging dough products with additional ingredients. While certain preferred embodiments of the present invention have been set forth, it should be understood that various changes or modifications could be made without departing from the spirit of the present invention. For instance, although in the preferred embodiment both the container and cup are generally cylindrical in shape, it should be realized that different complementary geometric shapes could be employed, while still embodying the guide members and the frictional fit arrangement as detailed above. In general, the invention is only intended to be limited by the scope of the following claims.

The invention claimed is:

1. A packaged food product comprising:
a container including at least one sidewall;
a first end closure sealing a first end of the container;
a second end closure sealing a second end of the container;
at least one dough product within the container;
a cup within the container, wherein the cup includes at least one sidewall, a plurality of guide members projecting at spaced circumferential positions from the sidewall, a bottom wall and an upper rim defining an opening and including a downturned portion, opposite the bottom wall, leading to an interior storage cavity of the cup, with the upper rim and the plurality of guide members extending from the downturned portion along the at least one sidewall of the cup and contacting an interior surface of the at least one sidewall of the container to frictionally fit the cup within the container; and
at least one additional food ingredient within the cup.

2. A packaged food product comprising:
a container including at least one sidewall;
a first end closure sealing a first end of the container;
a second end closure sealing a second end of the container;
at least one dough product within the container;
a cup within the container, wherein the cup includes at least one sidewall, a plurality of guide members projecting at spaced circumferential positions from the sidewall, a bottom wall and an upper rim defining an opening, opposite the bottom wall, leading to an interior storage cavity of the cup, with the upper rim and the plurality of guide members contacting an interior surface of the at least one sidewall of the container to frictionally fit the cup within the container, wherein each of the plurality of guide members includes a first, tapered portion and a second portion, with the second portion leading to the upper rim; and
at least one additional food ingredient within the cup.

3. The packaged food product of claim 2, wherein the second portion of each of the plurality of guide members has an outer diameter equal to an outer diameter of the upper rim.

4. The packaged food product of claim 1, wherein the at least one sidewall of the container has an inner surface and the at least one sidewall of the cup has an outer surface, with the outer surface of the cup being spaced from the inner surface of the container.

5. The packaged food product of claim 4, wherein the outer surface of the cup is substantially parallel to the inner surface of the container.

6. The packaged food product of claim 4, wherein the outer surface of the cup is spaced from the inner surface of the container by the rim and second a portion of each of the plurality of guide members.

7. The packaged food product of claim 4, wherein the cup includes a bottom wall positioned juxtapose the second end closure, with the at least one dough product being located between the upper rim of the cup and the first end closure.

8. The packaged food product of claim 1, wherein the bottom wall of the cup includes an internal convex central portion.

9. The packaged food product of claim 1, wherein both the container and the cup are substantially cylindrical in shape.

10. The packaged food product of claim 1, wherein the container has a spirally-wound construction of an inner liner layer, an outer label layer and one or more intermediate layers of composite material.

11. The packaged food product of claim 1, wherein the at least one dough product comprises a plurality of cinnamon rolls, and the at least one additional food ingredient comprises icing.

12. The packaged food product of claim 1, further comprising a cup cover extending across the upper rim, said cup cover directly engaging the interior surface of the at least one sidewall of the container.

13. The packaged food product of claim 12, wherein the cup cover comprises a foil which wraps around and is crimped under the upper rim.

14. A method of packaging a food product comprising:
  initially, partially inserting a cup, having an internal cavity storing at least one additional food ingredient within the cup, within a container through a first open end of the container, with a plurality of guide members projecting at spaced circumferential positions from at least one sidewall of the cup, and with a portion of each guide member extending from a downturned portion of an upper rim of the cup along the at least one sidewall of the cup and contacting an inner surface of at least one sidewall of the container;
  shifting the cup further into the container whereupon an upper rim of the cup, defining an opening, opposite a bottom wall of the cup, leading to the internal storage cavity, becomes frictionally fit within the container and the plurality of guide members contact the interior surface of the at least one sidewall of the container;
  closing a second open end of the container with a first end closure;
  depositing at least one dough product into the container through the first open end of the container; and
  closing the first open end of the container with a second end closure.

15. The method of claim 14, wherein the plurality of guide members includes first tapered portions which initially engage the inner surface of the container.

16. The method of claim 15, wherein the plurality of guide members includes second portions which extend directly from the rim, with the second portions engaging the inner surface of the container as the first, tapered portions no longer contact the inner surface.

17. The method of claim 16, further comprising: leveling the cup within the container upon initially, partially inserting the cup within the container through engagement of the first, tapered portions of the plurality of guide members with the inner surface of the container.

18. The method of claim 14, further comprising: directly engaging the downturned portion of the upper rim with the inner surface of the container to frictionally fit the cup within the container.

19. The method of claim 14, wherein depositing the at least one dough product into the container includes depositing a plurality of cinnamon rolls, and inserting the cup into the container includes adding icing within the container.

20. The method of claim 14, wherein closing each of the first and second ends constitutes sealing the first and second ends.

21. The method of claim 20, further comprising: allowing the at least one dough product to proof and expand within the container after sealing the first and second ends.

22. The method of claim 14, further comprising: sealing the cup with a cover prior to inserting the cup into the container.

23. The method of claim 22, wherein sealing the cup comprises extending a foil across the upper rim, with the foil wrapping around and being crimped under the upper rim.

* * * * *